UNITED STATES PATENT OFFICE.

PAUL ALEXANDER, OF CHARLOTTENBURG, GERMANY.

PROCESS FOR THE PRODUCTION OF AQUEOUS CAOUTCHOUC SOLUTIONS AND THE REGENERATION OF RUBBER WASTE.

No. 844,077.          Specification of Letters Patent.          Patented Feb. 12, 1907.

Application filed November 30, 1906. Serial No. 345,724.

*To all whom it may concern:*

Be it known that I, PAUL ALEXANDER, doctor of philosophy and chemist, a subject of the German Emperor, and resident of Charlottenburg, in the Kingdom of Prussia, German Empire, have invented new and useful Improvements in the Processes for the Production of Aqueous Caoutchouc Solutions and for the Regeneration of Rubber Waste, of which the following is a full, clear, and exact specification.

In another patent of the applicant there is described a process for the manufacture of aqueous solutions of caoutchouc which consists in dissolving caoutchouc of any kind, including waste caoutchouc, in the known solvents and subsequently treating these solutions with strong alkaline liquids and afterward with steam. The action of the solvent—for instance, benzene—upon the caoutchouc can, if necessary, proceed under pressure. From the solution so obtained the undissolved parts are mechanically separated, and the solution is heated, preferably again under pressure, for some time with an aqueous solution of caustic soda or the like. The solution which is thus produced is distilled in steam, whereupon a considerable part of the steam condenses in the distillation vessel, the benzene or the like distils away, and the residual aqueous solution of caoutchouc is filtered or is freed from mechanical impurities by sedimentation.

By the manufacture which forms the subject-matter of the present invention the proceeding is at first similar to that described above—that is to say, a solution of caoutchouc in one of the usual solvents, like benzene, is made. This solution is treated with a strong alkaline lye, and the product is brought into a distillation vessel. Thereupon water is brought into this vessel and steam is led into this mass. The benzene distils, as in the former case, but no solution is formed. Instead there remains a viscous mass of caoutchouc and an aqueous alkaline liquid which may easily be separated from each other. The viscous mass is produced in this case because the steam does not, as in the former process, effect a fine subdivision of the condensation-water in the caoutchouc solution or a subdivision of the caoutchouc solution in the condensation-water. Instead the steam has condensed in the previously-added water without subdividing the benzene-caoutchouc solution in the manner necessary for the formation of a solution. The viscous mass can now be converted into an aqueous solution of caoutchouc in one of several ways, depending on the raw material which was used. In many cases it suffices to stir thoroughly the viscous mass with cold water in order to obtain a solution. In other cases it is preferable to use hot water. Finally, if neither of these methods produces a satisfactory solution the mass is treated for some time with hot water under pressure, whereupon the desired solution is produced.

Example: One thousand kilos of waste rubber are heated at 150° centigrade with three thousand kilos of benzene for 3-4 hours in a vessel under pressure. The undissolved portions are then mechanically separated. The solution is returned to the pressure vessel and is heated for about three hours with an aqueous solution of two hundred kilos of caustic soda in three hundred and fifty kilos of water at 150° centigrade while stirring. The mass produced is then brought into a distillation vessel, together with an equal weight of water, and steam is led in. The benzene distils off, and there remains a viscous mass of caoutchouc and an aqueous alkaline liquid. The liquid can easily be poured off from the caoutchouc mass. The viscous mass is then heated with any suitable proportion of water, such as nine times its weight, for several hours under three to four atmospheres pressure. There is produced an aqueous solution of caoutchouc, which may be applied in any desired manner and from which the caoutchouc may be precipitated by agents, such as acids, chimney-gases, or the like.

This process possesses the great advantage that aqueous solutions of caoutchouc of any desired concentration may be manufactured thereby, according to the proportion of water which is added to the viscous caoutchouc mass obtained in the manner described. Thus it is possible by using this process to separate completely, or nearly so, the surrogates from old caoutchouc containing such materials without the saponification products produced from the surrogates by the alkali treatment rendering the caoutchouc solution impure. Impurities of this kind have an injurious effect, because when the solution is precipitated by adding an acid the saponification products are precipitated, together with the caoutchouc. In the foregoing process, however, the saponification products remain in the aqueous alkaline liquid which is free from caoutchouc and may be easily poured away from the caoutchouc with this liquid. It is possible by this invention to obtain very pure aqueous solutions of caoutchouc, and consequently a very pure caoutchouc.

What I claim is—

1. The process herein described of producing solutions of caoutchouc, which consists in dissolving caoutchouc first in one of its well-known solvents, next treating the solution thus obtained with a strong alkaline aqueous liquid, adding water to the resulting product and then subjecting this mixture to the action of steam until the solvent is distilled off from the solution, separating the resulting alkaline liquid from the resulting viscous caoutchouc mass and dissolving this mass by stirring with water.

2. The process herein described of producing solutions of caoutchouc, which consists in dissolving caoutchouc first in one of its well-known solvents, next treating the solution thus obtained with a strong alkaline aqueous liquid, adding water to the resulting product and then subjecting this mixture to the action of steam until the solvent is distilled off from the solution, separating the resulting alkaline liquid from the resulting viscous caoutchouc mass and dissolving this mass by stirring with hot water.

3. The process herein described of producing solutions of caoutchouc, which consists in dissolving caoutchouc first in one of its well-known solvents, next treating the solution thus obtained with a strong alkaline aqueous liquid, adding water to the resulting product and then subjecting this mixture to the action of steam until the solvent is distilled off from the solution, separating the resulting alkaline liquid from the resulting viscous caoutchouc mass and dissolving this mass by stirring with hot water under pressure.

4. The process herein described of treating rubber waste, which consists in dissolving rubber waste first in one of the ordinary solvents of caoutchouc, separating this solution mechanically from the impurities, next treating the solution thus obtained with a strong alkaline aqueous liquid, adding water and subjecting the mixture to the action of steam until the solvent is distilled off from the solution, separating the resulting viscous caoutchouc mass from the resulting alkaline liquid, dissolving the viscous caoutchouc mass by stirring with water, separating the solution of caoutchouc thus obtained from the remaining impurities and precipitating the caoutchouc from the purified solution by means of an acid agent.

5. The process herein described of treating rubber waste, which consists in dissolving rubber waste first in one of the ordinary solvents of caoutchouc, separating this solution mechanically from the impurities, next treating the solution thus obtained with a strong alkaline aqueous liquid, adding water and subjecting the mixture to the action of steam until the solvent is distilled off from the solution, separating the resulting viscous caoutchouc mass from the resulting alkaline liquid, dissolving the viscous caoutchouc mass by stirring with hot water, separating the solution of caoutchouc thus obtained from the remaining impurities and precipitating the caoutchouc from the purified solution by means of an acid agent.

6. The process herein described of treating rubber waste, which consists in dissolving rubber waste first in one of the ordinary solvents of caoutchouc, separating this solution mechanically from the impurities, next treating the solution thus obtained with a strong alkaline aqueous liquid, adding water and subjecting the mixture to the action of steam until the solvent is distilled off from the solution, separating the resulting viscous caoutchouc mass from the resulting alkaline liquid, dissolving the viscous caoutchouc mass by stirring with hot water under pressure, separating the solution of caoutchouc thus obtained from the remaining impurities and precipitating the caoutchouc from the purified solution by means of an acid agent.

In testimony that I claim the foregoing as my invention I have signed my name in presence of two subscribing witnesses.

PAUL ALEXANDER.

Witnesses:
WOLDEMAR HAUPT,
HENRY HASPER.